United States Patent [19]

Berg

[11] 4,451,429

[45] May 29, 1984

[54] PULVERIZING SPUTTERED DEPOSITS TO MAKE POWDERED METAL

[75] Inventor: Morris Berg, Champaign, Ill.

[73] Assignee: General Motors Corporation, Detroit, Mich.

[21] Appl. No.: 396,355

[22] Filed: Jul. 8, 1982

[51] Int. Cl.³ ............................................. B22F 3/00
[52] U.S. Cl. ...................................... 419/33; 419/19; 419/30
[58] Field of Search ............................. 419/33, 19, 30

[56] References Cited

U.S. PATENT DOCUMENTS 3,367,775 2/1968 Allen ..................................... 419/33
4,244,798 1/1981 Gold et al. .................... 204/192 SP

OTHER PUBLICATIONS

Hirschhorn, Introduction to Power Metallurgy, pp. 33–37, (1969).

Primary Examiner—Brooks H. Hunt
Attorney, Agent, or Firm—Robert J. Wallace

[57] ABSTRACT

A method of reclaiming precious metal incidentally sputtered into vacuum chamber walls, fixtures, and the like. The incidentally sputtered precious metal is reclaimed by grinding it into a metal powder that is useful as an electrical conductor in a cermet ink. Power can also be made by pulverizing the principally sputtered metal too.

6 Claims, No Drawings

PULVERIZING SPUTTERED DEPOSITS TO MAKE POWDERED METAL

FIELD OF THE INVENTION

This invention relates to sputtering, and to a technique for reclaiming sputtered metal. More specifically it involves pulverizing brittle sputtered deposits of a ductile target metal to form a useful powder. This could be used to form a cermet ink.

BACKGROUND OF THE INVENTION

Sputtering is a vacuum process in which a negatively charged target surface is eroded by ion bombardment. The bombarding ions expel atoms from the target surface The expelled atoms travel in all directions away from the target and deposit on surfaces they contact. A majority of atoms travel toward an anode that is also present in the vacuum chamber. A substrate can thus be most effectively coated by placing it in the chamber between the target and anode but closer to the anode to receive the predominant deposition.

Nonetheless, there is an incidental deposition that occurs on other surfaces in the vacuum chamber too, as for example on the chamber walls, anode supports, substrate holders, fixturing, etc. Eventually these incidental deposits become so thick that they should be removed. These incidental deposits do not adhere well to their supporting surfaces. Hence, they can be readily physically removed from them by scraping, peeling, and maybe even by a water blast. If the accumulated incidental deposit is a precious metal such as platinum, gold, palladium, silver, etc., one would also want to reclaim it. To reclaim it one would ordinarily send it to a refiner for reprocessing.

I have recognized that some sputtered metal deposits are quite brittle, particularly deposits of precious metals that are normally ductile. Also, I have noted that in many commercial processes, one usually sputters the same metal in a given apparatus over a long period of time. The resulting sputtered deposits are essentially as pure as the target metal itself. Usually the target metal is quite pure. I have further found that some of the sputtered deposits are so brittle that they can be pulverized into a metal powder. The metal powder is so pure that it can be used in a variety of applications. In fact, I have even reclaimed incidentally sputtered platinum deposits by grinding them into a powder, and making the powder into an electrically conductive cermet ink.

OBJECTS AND SUMMARY OF THE INVENTION

A principal object of this invention is, therefore, to provide a method of reclaiming an incidental deposit of sputtered metal, especially of a precious metal such as platinum.

Another object of the invention is to make a metal powder by sputtering brittle deposits of normally ductile metals, and then pulverizing the brittle sputtered deposits.

A further object of the invention is to make a thick film conductor ink from a pulverized sputtered deposit, especially an incidentally sputtered deposit of a precious metal.

The invention comprehends sputtering a metal from a target whose surface is a solid mass that cannot be readily mechanically comminuted. The deposit is sputtered to be inherently brittle when deposited. Deposits on vacuum chamber walls, fixtures and the like do not adhere well naturally and can easily be mechanically stripped from their supporting surfaces and accumulated. Deposits from the principal deposition areas can be included too. The accumulated deposits are then pulverized into granules that can be used in many applications. In a preferred embodiment, brittle platinum deposits are ground into platinum powder, and mixed with a powdered glass and a vehicle, to form a cermet thick film ink.

DESCRIPTION OF THE PREFERRED EMBODIMENTS

One cannot mechanically comminute a ductile metal directly into metal granules. Such metal prefers to deform and smear, and at best form irregular flakes of various larger sizes, rather than break into granules. Hence, one cannot simply be ground into small particles. Accordingly, small particles of ductile metals are normally made by other techniques, as for example complex evaporation techniques, complex chemical precipitation and reduction techniques, etc. In addition, it may be difficult, and even impossible, to produce powders of particular alloys by the usual prior art techniques. For example, particular alloy compositions may not retain their initial composition when evaporated. In addition, salts of different metal elements forming a given alloy may not be similarly or compatibly precipitable or reducible.

On the other hand, I have noted that sputtered coatings of ductile metals, especially precious metals such as platinum and palladium can be quite brittle as deposited. In other words, the sputtering target can be of a ductile metal, and yet the deposit is brittle. By ductile, I mean the metal is readily deformable or elongatable, without attendant fracture. By brittle I mean the sputtered metal has a quality that leads to crack propagation without appreciable deformation. In other words, pieces of the sputtered metal will fracture with little or no plastic deformation. I believe that it is generally not too difficult to produce embrittled deposits of ductile mtals. In many instances, the problem has been how to avoid them. In any event, if a given deposit is not brittle enough to pulverize, one can generally make it more brittle by increasing the deposition pressure, increasing the coating thickness to beyond 30 angstroms, and/or increasing the deposition power. On the other hand, the deposition power should not be increased so much that it generates enough heat in the deposit to anneal it. Analogously, if the deposit is very rapidly deposited and ductile as-deposited, one should check to see if annealing temperatures are achieved. If they are, deposition power should be reduced. In substance then, it appears that the sputtering conditions which produce brittle deposits are not particularly critical, and can be varied widely. In addition, I expect the preferred conditions will be a function of the metal being deposited.

Incidentally, I prefer to use the metal powder of this invention as ground. On the other hand, one may prefer to coat the powder granules or even heat treat them before use.

This invention was found to be useful in reclaiming incidentally deposited platinum in a model MRC 902 DC magnatron sputtering apparatus obtained from Materials Research Corporation of Orangeburg, N.Y. Such surfaces are generally stainless steel and include fixtures, vacuum chamber walls, the anode, anode supports, etc. The incidentally deposited metal is sometimes also referred to as overspray. The MRC 902 apparatus referred to above has an elongated but fairly shallow main vacuum chamber with a rectangular target transversely oriented over a larger rectangular anode. The anode is essentially a rectangular stainless steel element about 35 cm wide, 50 cm long and 2–3 cm thick. The target comprises a rectangular ductile platinum sheet about 12 cm by 38 cm by 0.6 cm bonded to a supporting copper backing plate. The target is assembled with a cathode that includes water cooling and a magnetic array.

Working access to the main chamber is obtained via an antechamber, through a movable seal. The antechamber is also sealed from the ambient. A stainless steel wheeled carrier shuttles pallets of workpieces between the antechamber and main chamber without exposing the main chamber to atmospheric pressure. On the other hand, the main chamber can be opened along a horizontal separation line, to expose its contents for servicing the target and reclaiming of incidentally deposited metal.

A brittle platinum deposit is obtained with this machine by establishing an electrical discharge between the target and the anode at a DC voltage of about 500–800 volts while maintaining a pressure of about 4–40 millitorr, preferably about 10–20 millitorr, in the main chamber. The sputtering power supply is adjusted to provide a DC power between the target and the anode of approximately 13–22 watts/cm$^2$ of target area. After the adjusted discharge has stabilized the carrier slowly continuously moves a pallet across the area under the target, whereupon the discharge is discontinued. A brittle platinum deposit forms everywhere within the vacuum chamber but mostly on workpieces and portions of the pallet not covered by the workpieces. Carrier speed is adjusted to obtain the desired coating thickness on the workpieces. If the coating on the workpieces were to be recovered and ground, the workpiece coating thickness should be in excess of 30 angstroms.

Sputtering pressure is dynamically achieved and maintained. The antechamber-main chamber seal is opened while the antechamber and main chamber are at about 100 millitorr. The workpieces are moved into the main chamber on the carrier but not to a location under the target. The antechamber-main chamber seal is then closed and the main chamber is pumped down to below $5 \times 10^{-6}$ Torr A flow of 75% nitrogen-25% argon by volume is then introduced into the main chamber at a rate of about 75–100 cc/minute, while pumping continues. Pumping is then throttled to dynamically maintain a pressure of about 5–40 millitorr, preferably about 10–20 millitorr, for sputtering. After sputtering, I prefer to maintain the pressure at the same level in the same way until we are ready to open the antechamber-main chamber seal. The main chamber pressure can then be raised to about 100 millitorr, and the antechamber-main chamber seal opened. To open the main chamber for servicing, room atmosphere is admitted to the main chamber until it is at ambient pressure.

Servicing is periodically required because over a period of time a considerable thickness of overspray platinum can deposit on the pallet carrier, the anode, the chamber walls, and the anode supports. I do not believe the overspray platinum is more or less brittle than the platinum on the pallet or workpieces. However, I think the overspray platinum is less adherent to its supporting surfaces. In any event, overspray platinum can be readily mechanically separated, i.e. stripped, from its supporting surfaces in a variety of ways. For example, it can be stripped by scraping with a knife or razor blade, by peeling, and perhaps merely by the action of a water jet.

If the substrate and pallet surfaces are clean, the platinum should adhere more strongly to them than to the overspray surfaces. Hence, if one wants to use my invention to principally make powder, and not just reclaim overspray, he may prefer to employ some sort of a parting agent on the principal deposit surfaces over the anode, i.e. the substrate and its carrier. An oil film or an oxide film may be satisfactory as a parting agent. It may be desirable to have an aluminum plate be a principal deposit surface, and a native oxide film on it as the parting agent film. Analogously, one may choose to redesign the sputtering equipment in some way to permit more rapid deposition of the sputtered metal in the principal target areas, produce poor adhesion on surfaces it contacts, and easier collection of deposited brittle metal.

In any event, one gathers the scrapings, peelings, etc., whether it be of principal deposit platinum or overspray platinum, to form a quantity of brittle sputtered metal. The gathered sputtered metal is then placed in any of the normal and accepted pulverizing devices and ground into small particles. Any of the commercially available equipment normally used for comminuting metals can be used in this invention as for example a power driven tungsten carbide motar unit obtained from Siebtecnik. After grinding for about 20 minutes with such equipment, 90% of the sputtered platinum powder will pass through a 200 mesh screen.

The foregoing powder can be used in many applications such as in forming special shapes for electrical contacts, wear surfaces, and the like. In addition, it can be used to form inks for electronic circuits and electrodes. By "ink" I mean a powdered metal-glass composition used to form a conductive coating that is fusible at an elevated temperature and once fused forms an adherent coating of predetermined electrical conductance, i.e. resistance, on ceramic surfaces. Such compositions can also include some nonfusible powdered oxides, along with the glass, if a low conductance, i.e. high resistance, is desired. The proportions of metal, oxide (if any) and glass one chooses to use will depend on the particular conductance one predetermines he should have. In the following example, I want to have a high predetermined conductance.

About 30 grams of the powdered platinum passing the 200 mesh screen can be mixed with about 7.5 grams of a suitable glass powder, such as Ferro Frit No. 3291, obtained from Ferro Corporation Coatings Division of Cleveland, Ohio, along with about 6 ounces of Type 163-C squeegie media, obtained from L. Reusche & Co., Newark, N.J. The composition is blended on a three roll mill to obtain a uniform mixture referred to as ink. If desired, an organic thinner such as terpene alcohol can be added to the ink to more precisely control viscosity. Hercules No. 318 Terpineol can be used. Such an ink can be silk screened onto a previously fired ceramic substrate such as partially stabilized zirconia. It is then dried and fired in the usual manner. For example, it can be dried at about 38–150° C., preferably about 150° C. Firing can be done in a 6 hour firing schedule that starts by placing the coated ceramic substrate in a room temperature muffle furnace. The furnace is then heated to about 1000° C. using an air atmosphere, and held there for about 1–1½ hours. Furnace heating is then discontinued and the furnace allowed to cool naturally. When the furnace has cooled to below 400° C., preferably below about 200° C., the furnace can be opened and the substrate removed. Heating to the firing temperature and cooling to below 400° C. each takes about 2½ hours. The preferred firing schedule and maximum firing temperature can of course be varied, depending on the particular glass frit and powdered metal one would use in making the ink. In any event a highly conductive adherent coating results that is useful at temperatures below the firing temperature.

I have specifically described how to use my invention to reclaim platinum overspray in MRC 902 sputtering apparatus. On the other hand, I do not believe that it is necessary to limit the invention to that apparatus, to the process described, or to the reclaiming of overspray. If the overspray metal is brittle, the principal deposit metal should be too. In addition, I believe that most, if not all, ductile target metals can be deposited in brittle form, under various conditions. For example, titanium is brittle when sputtered from a ductile titanium target with an Rf power supply at a pressure of about 30–35 millitorr. Palladium is brittle when deposited from a ductile palladium target under the same conditions as hereinbefore described for platinum. A ductile alloy containing 10% by weight tin and the balance indium has been DC magnatron sputtered at a pressure of about 5–15 millitorr to produce a brittle deposit of the same composition. Nickel has been Rf sputtered from a ductile target at a pressure of about 30–35 millitorr to produce a brittle deposit. I, therefore, expect this invention can be used to produce pulverizable deposits of still other ductile metals, such as gold, silver, copper, and still others. However, I suspect this invention will be most immediately practical in reclaiming overspray deposits of precious metals such as platinum, palladium and gold.

Some of the brittle deposits were produced at a forward power of about 8 kilowatts, using a target area similar to that previously described. On the other hand, the brittle 10% tin–90% indium deposit was obtained at a power setting of only one kilowatt. Accordingly, rate of deposition can vary depending on the metal.

Acquisition of brittle deposits does not appear to be critically dependent upon the sputtering atmosphere either. Brittle deposits have been obtained from ductile targets in an argon atmosphere, an argon atmosphere containing sizeable proportions of oxygen and/or nitrogen, and a nitrogen atmosphere containing a minor proportion of argon. Perhaps the deposits are brittle because the sputtering process deposits extremely fine-grained structures that have gas trapped at the grain boundaries.

I Claim:

1. A method of making a metal powder from a mass of ductile metal that cannot be readily mechanically comminuted comprising the steps of sputtering the mass of ductile metal into a vacuum environment to produce a brittle deposit of the metal, gathering at least some of the brittle metal deposit, and pulverizing it into metal particles.

2. A method of making a metal powder from a mass of ductile precious metal that cannot be readily mechanically comminuted comprising the steps of sputtering brittle precious metal from a ductile target onto a substrate in a vacuum chamber, collecting at least a portion of the brittle precious metal from the substrate, and pulverizing the brittle precious metal into metal particles.

3. A method of making a metal powder from a ductile mass of metal selected from the group consisting of platinum, palladium and alloys thereof comprising the steps of DC magnatron sputtering from a target of such metal onto a surface so as to form a brittle coating of the target metal, separating portions of the brittle metal coating from the surface, accumulating those portions, and grinding the portions to form metal granules.

4. A method of reclaiming previous metal incidentally sputtered from a target surface of ductile metal as a brittle and pulverizable coating, comprising the steps of mechanically stripping at least a portion of the brittle and pulverizable previous metal coating from the stainless steel surfaces, pulverizing the portion into small particles, and mixing the small particles with a glass powder, effective to form a fusible composition for producing coatings of predetermined electrical resistance at elevated temperatures.

5. A method of reclaiming platinum incidentally sputtered as a coating onto stainless steel surfaces serving as support devices, walls and the like in a DC magnatron sputtering chamber at a pressure of about 10–20 millitorr, comprising the steps of mechanically stripping some of the platinum coating from the stainless steel surfaces, pulverizing the portions into irregular platinum granules, and mixing the platinum granules with a glass frit effective to form a composition fusible at a given elevated temperature and useful as an electrically conductive coating on ceramics below that elevated temperature.

6. A method of reclaiming a brittle platinum coating that is DC magnatron sputtered at a pressure of about 5–40 millitorr from a ductile platinum target as an incidental coating onto stainless steel surfaces serving as support devices, walls and the like in a sputtering chamber, comprising the steps of mechanically stripping at least portions of the platinum coating from the stainless steel surfaces, grinding the portions into irregular granular platinum particles, and mixing the platinum particles with at least a glass frit, effective to form a composition suitable for electrically conductive coatings useful on ceramic surfaces at elevated temperatures.

* * * * *

UNITED STATES PATENT AND TRADEMARK OFFICE
CERTIFICATE OF CORRECTION

PATENT NO. : 4,451,429
DATED : May 29, 1984
INVENTOR(S) : Morris Berg

It is certified that error appears in the above—identified patent and that said Letters Patent is hereby corrected as shown below:

Title page, column 2, line 5, "Power" should read -- Powder --.

Column 1, line 16, after "surface" insert -- . --.

Column 3, line 49, after "Torr" insert -- . --.

Signed and Sealed this

Twenty-third Day of October 1984

[SEAL]

Attest:

GERALD J. MOSSINGHOFF

Attesting Officer    Commissioner of Patents and Trademarks